(12) United States Patent
Kirschner et al.

(10) Patent No.: US 7,226,325 B1
(45) Date of Patent: Jun. 5, 2007

(54) DEVICE FOR STABILIZING RE-ENTRANT CAVITY FLOWS PAST HIGH-SPEED UNDERWATER VEHICLES

(75) Inventors: Ivan N. Kirschner, Portsmouth, RI (US); James S. Uhlman, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/832,086

(22) Filed: Apr. 11, 2001

(51) Int. Cl.
*B63H 11/00* (2006.01)

(52) U.S. Cl. .................... 440/44; 114/67 A; 114/337

(58) Field of Classification Search ............ 114/20.1, 114/20.2, 337, 67 A, 67 R; 440/44, 45; 244/34 R, 244/35 R, 204, 208, 209
See application file for complete search history.

(56) References Cited

U.S. PATENT DOCUMENTS

| | | | | |
|---|---|---|---|---|
| 2,696,075 A | * | 12/1954 | Griffith | ............... 244/75 |
| 3,205,846 A | * | 9/1965 | Lang | ............... 114/67 A |
| 3,392,693 A | * | 7/1968 | Hulsebos et al. | ........... 114/20.1 |
| 4,186,679 A | * | 2/1980 | Fabula et al. | ............... 114/20.1 |
| 4,991,530 A | * | 2/1991 | Rathsam | ............... 114/20.1 |
| 5,480,110 A | * | 1/1996 | Lobert | ............... 244/130 |

* cited by examiner

*Primary Examiner*—S. Joseph Morano
*Assistant Examiner*—Ajay Vasudeva
(74) *Attorney, Agent, or Firm*—James M. Kasischke; Michael F. Oglo; Jean-Paul A. Nasser

(57) ABSTRACT

A stabilizing device for a supercavitating vehicle that isolates re-entrant jet flows of liquid from its cavity. The device has a receiving means positioned on the supercavitating vehicle where the re-entrant jet flow impinges on the supercavitating vehicle. An exit means is joined to the receiving means for carrying the received re-entrant jet flow out of interference with the cavity. The exit means includes an exhaust nozzle joined to the aft of the supercavitating vehicle and a re-entrant jet nozzle positioned in communication between the receiving means and said exhaust nozzle transferring said received re-entrant jet flow into the exhaust nozzle. This stabilizes the cavity and improves controllability and maneuverability of the supercavitating vehicles while also reducing the gas ventilation required to maintain the cavity. Furthermore, this reduces self-generated noise allowing improved operation of acoustical sensors incorporated in the vehicle.

10 Claims, 5 Drawing Sheets

DEVICE FOR STABILIZING RE-ENTRANT CAVITY FLOWS PAST HIGH-SPEED UNDERWATER VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present-invention relates generally to high-speed underwater vehicles. More particularly, this invention relates to stabilization of cavitating flows past high speed underwater vehicles to improve performance.

(1) Description of the Prior Art

Currently, high-speed underwater vehicles can be used in offensive and defensive roles. Often they may be designed to reduce drag by generating enough gas to envelope them in a gas filled cavity. These vehicles have been referred to as supercavitating vehicles, and enveloping them in a gas-filled cavity improves speed and maneuverability, and provides other favorable capabilities. FIG. 1 schematically shows a representative rocket-propelled, supercavitating body, or vehicle 10 capable of operating in the re-entrant jet regime. Supercavitating vehicle 10 has a forebody 12 and midbody 14, and nose portion 16 of forebody 12 has a cavitator 18 that is associated with cavity 20. Cavity 20 starts at the low-pressure point. In the case shown, this is at the salient edges of cavitator 18. Cavitator 18 is sized to generate cavity 20 at the design speed, design depth and design cavity pressure of supercavitating vehicle 10. Consequently, cavity 20 almost completely envelops vehicle 10 to reduce the total drag of vehicle 10 by significant reduction of the drag component attributed to skin friction. For most practical cases of interest, maintenance of the designed cavity pressure of cavity 20 will require ventilation of the cavity by an internal gas source (not shown) that vents gas through ventilation ports 22 in forebody 12 at nearly the same hydrostatic pressure as the ambient fluid, or water 100, at the designed operating depth of vehicle 10.

The configuration of vehicle 10 incorporates nozzle extender, or blast tube 26 that locates exit plane 28 of propulsion nozzle 30 in some optimal location with respect to the aftermost point, or transom 14a of midbody 14. It is important that cavity 20 be maintained large enough to envelope fore and midbodies 12 and 14 of vehicle 10 for satisfactory operation of supercavitating vehicle 10. Entrainment of vented gases by propulsion plume 34 expelled through propulsion nozzle 30 tends to stabilize dimensions of cavity 20 over an expected range of operating conditions. Moreover, impingement of re-entrant jet 102 of ambient water 100 on aftward face, or transom 14a of midbody 14 can result in additional drag reduction beyond that already associated with operation in the supercavitation regime.

The configuration of supercavitating vehicle 10 may be subject to variation. These variations can be in the relative lengths of forebody 12, midbody 14, and nozzle extender 26. Variations can also be made in the transverse dimensions of cavitator disc 18, midbody 14, nozzle extender 26, and propulsion nozzle 30, and the profiles of forebody 12 and propulsion nozzle 30. In addition, nozzle extender 26 could be boat-tailed, and appropriate tailoring can be performed with respect to the configurations and arrangements of the cavitator 18, ventilation ports 22, the dimensions of cavity 20, the operational conditions, and other design dimensions and parameters, as part of the design of vehicle 10. Such variations of these parameters are not significant for the invention to be described below, nor are any variations associated with the shapes of control surfaces, appendages, sensors, and any geometrical features intended to account for gravitational effects on the shape or extent of cavity 20.

Closures of hydrodynamic cavities in flows of liquids for which the freestream velocity has a horizontal component fall generally into one of three categories: (1) oscillating re-entrant jets; (2) toroidal vortex shedding; and, (3) twin-vortex flow systems. The type of closure that is observed for a particular flow depends on the cavitation number (the flow parameter characterizing the tendency to maintain a cavity) and the Froude number (the flow parameter characterizing the relative importance of fluid inertia and gravitational acceleration). Vehicles, such as vehicle 10, that are designed to run in a supercavitating condition for reduced drag are often provided with a gas ventilation system to maintain a cavity of sufficient dimensions to envelope most of the body. The rate of ventilation required to maintain the cavity is dependent on the cavity closure type: high flow rates are required in the twin-vortex regime in which gas easily exits the cavity via the vortex system, moderate flow rates are required in the toroidal vortex shedding regime in which gas is entrained by the ambient liquid in a series of coherent vortices, and relatively low flow rates are required in the oscillating re-entrant jet regime in which gas entrainment by the main flow of liquid is impeded by the complicated interaction between the liquid flowing through the re-entrant jet and the liquid just outside the boundary of the cavity. Even in the oscillating re-entrant jet regime, the required ventilation rate can be significant since the re-entrainment of liquid is associated with a secondary re-entrainment of the ventilation gases.

For many applications, supercavitating vehicles are restricted to operations in the re-entrant regime due to constraints on the cavitation and Froude numbers. However, re-entrant jet flows of liquid are inherently unsteady, because liquid entering the gas cavity via the jet must disturb the cavity boundary to exit the system back into the main flow. Such unsteadiness can cause control problems, can limit the maneuverability of the vehicle, and can be associated with increased self-generated noise levels for any onboard acoustical sensors.

Thus, in accordance with this inventive concept, a need has been recognized in the state of the art for a device to stabilize the cavitating flows past self-propelled high-speed supercavitating vehicles, such as torpedoes and other supercavitating high-speed bodies for improving controllability and maneuverability, reducing gas ventilation rates needed to maintain cavities, and reducing self-generated noise for incorporated acoustical sensors.

SUMMARY OF THE INVENTION

A first object of the invention is to provide improved speed and control for supercavitating vehicles.

Another object of the invention is to provide a device to stabilize caviting flows past self-propelled supercavitating torpedoes and other supercavitating high-speed bodies.

Another object of the invention is to improve controllability and maneuverability of supercavitating vehicles and to reduce their gas ventilation rates required to maintain a cavity, and their self-generated noise for on-board acoustic sensors.

Another object of the invention is to provide a device to stabilize cavitating flows past self-propelled supercavitating torpedoes and other supercavitating high-speed bodies and use redirected liquid to further improve performance thereof.

Another object of the invention is to stabilize the impingement of the liquid jet of re-entrant fluid on the boundary of the cavity enveloping a supercavitating vehicle by providing an alternative path for the exit of this fluid from the cavity that is associated with reduced disturbance to the boundary of the cavity.

Another object of the invention is to re-entrain the entry of liquid of the re-entrant jet into the main flow to reduce secondary re-entrainment of ventilation gas.

Another object of the invention is to redirect the flow of re-entrant jet liquid for use in supercavitating vehicles as a diluent, coolant, lubricant, or some combination of thereof.

Another object of the invention is to distribute pressure over the aft end of a supercavitating vehicle to provide for further reduced drag beyond that already associated with operation in the supercavitation regime.

Another object of the invention is to reduce disturbances by redirecting the re-entrant jet of the liquid flowing into a cavity to inside the vehicle hull and to an exit point located well aft in the flow to reduce disruptive impingement on and disturbance of the boundary of the cavity.

Another object of the invention is to improve controllability and maneuverability of the vehicle by reducing disturbances to the boundary of the cavity to stabilize overall flow and reduce forces on control surfaces.

These and other objects of the invention will become more readily apparent from the ensuing specification when taken in conjunction with the appended claims.

Accordingly, the present invention provides a device for stabilizing re-entrant jet flows of liquid for a supercavitating vehicle. Annular structure mounted on an aft wall of a supercavitating vehicle defines an annulus-shaped inlet to absorb the re-entrant jet of liquid. An annular plenum receiving the annulus-shaped re-entrant jet captures it and sprays captured liquid from the plenum into a passageway for propulsion gases of the supercavitating vehicle.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENTS

Figure 1:
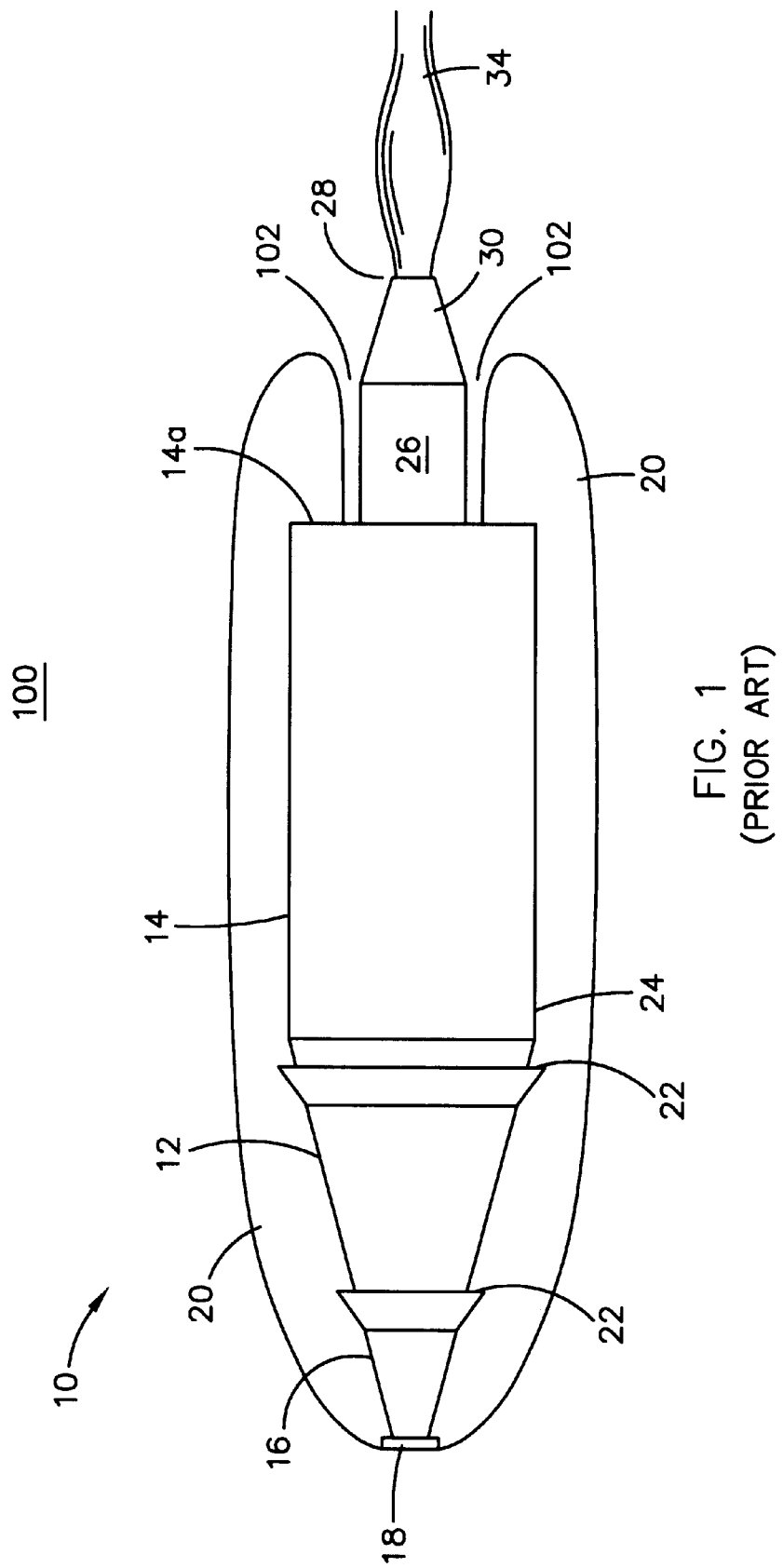
FIG. 1 is a schematic cross-sectional view of an exemplary supercavitating vehicle having a cavitator producing a gas filled cavity during high speed transit underwater.
Figure 2:
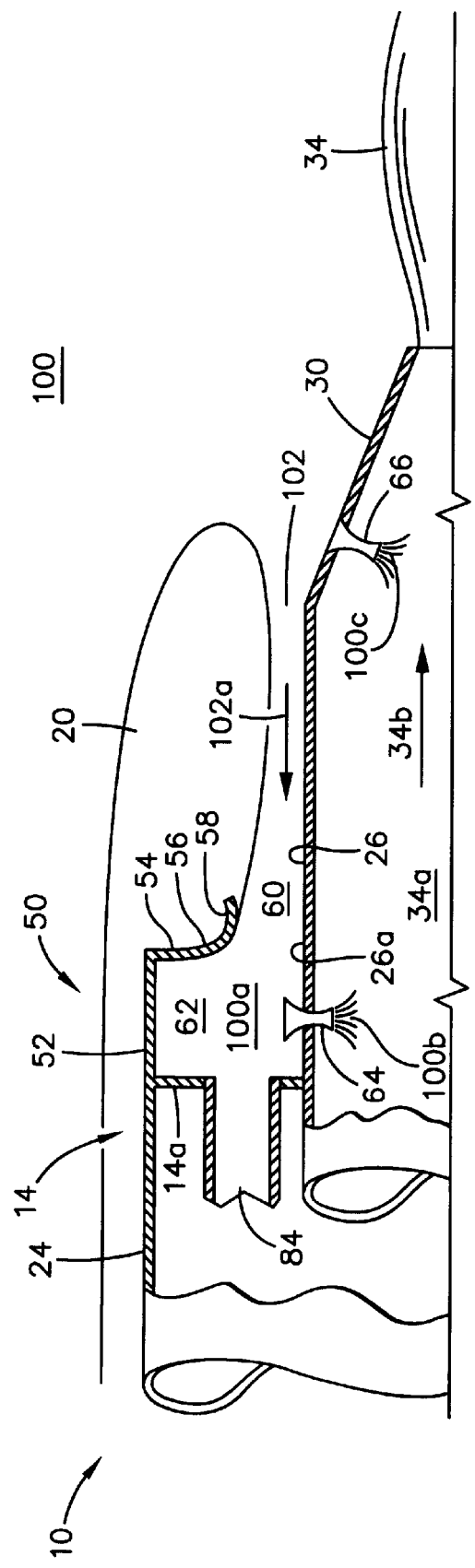
FIG. 2 schematically shows a cross-sectional view of a portion of a first embodiment of a stabilizing device of this invention on a supercavitating vehicle.

Referring to FIG. 2, stabilizing device 50 of this invention is shown mounted on an aft-most transom 14a of a supercavitating vehicle 10 of the type shown in FIG. 1 and described, above. A ring-shaped portion 52 of stabilizing device 50 extends from hull 24 of mid-body 14. Ring-shaped portion 52 may be integral with, or can be separate and attached by conventional means to hull 24. Annular wall 54 extends inwardly from ring-shaped portion 52 and has a flared section 56 that reaches aft of transom 14a and terminates in annular lip portion 58. Annular wall 54, flared section 56, and annular lip portion 58 are disposed in gas-filled cavity 20 that envelops nearly all of supercavitating vehicle 10.

Annular lip portion 58 extends a short distance and is spaced apart from outer surface 26a of nozzle extender 26 to define annular duct, or inlet 60 between annular lip portion 58 and outer surface 26a of nozzle extender 26. Annular inlet 60 captures liquid (water 100a) flowing into the volume of cavity 20 via an annulus-shaped re-entrant jet 102 of ambient water 100 (shown as arrow 102a in FIG. 2). Liquid 100a of annulus-shaped re-entrant jet 102 is directed to and captured in annular plenum 62 bounded by aft-most transom 14a, ring-shaped portion 52, and annular wall 54. The dynamic pressure of liquid 102a is recovered and converted to static pressure via a reduction in velocity that occurs through plenum 62 and plenum nozzles 64 that are mounted to extend through nozzle extender 26. In the preferred embodiment, plenum nozzles 64 are equidistantly spaced apart from one another around the circumference of nozzle extender 26; however, other configurations are envisioned. Also in the preferred embodiment, aft nozzles 66 are mounted to extend through propulsion nozzle 30. Liquid 100a that is captured in plenum 62 is thereby redirected from plenum 62 through plenum nozzles 64, and into passageway 34a channeling the flow of propulsion gases 34b. This redirected liquid 100b acts as a diluent in passageway 34a where it becomes a vapor and is vented via propulsion nozzle 30 as a vaporized part of propulsion plume 34. Liquid 100 near the outer part of re-entrant jet 102 of ambient water additionally may be fed to passageway 34a through aft nozzles 66, and into passageway 34a providing additional diluent for propulsion gases 34b, becoming vapor and being vented via propulsion nozzle 30 as part of propulsion plume 34.

An optional ducting system 84 can be provided in communication with transom 14a. Ducting system 84 draws liquid 100a from plenum 62 for providing to other systems of the supercavitating vehicle, as will be discussed with reference to FIG. 5.

Figure 3:
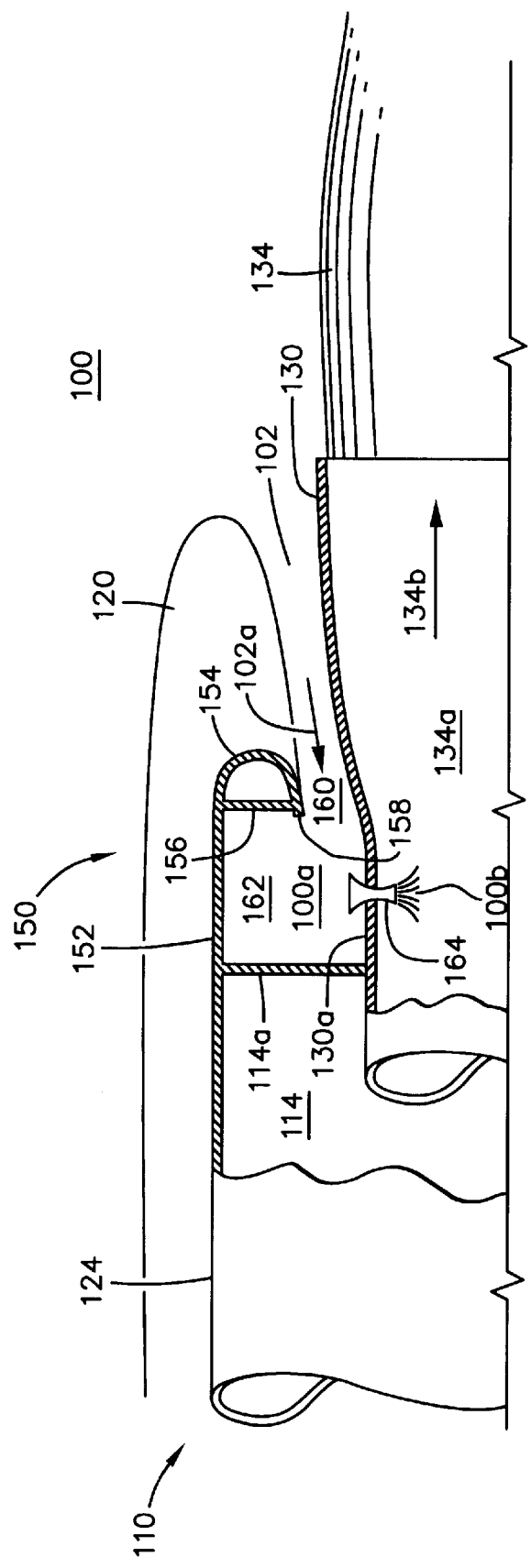
FIG. 3 schematically shows a cross-sectional view of a portion of a second embodiment of a stabilizing device of this invention on a supercavitating vehicle.

Referring to FIG. 3, stabilizing device 150 is an alternative geometry of the invention to optimize performance for supercavitating vehicle 110 that has only propulsion nozzle 130 extending behind it and not a nozzle extender. Inlet geometry of stabilizing device 150 is modified so that it can be mounted on aft-most transom 114a of supercavitating vehicle 110. A ring-shaped portion 152 of stabilizing device 150 extends from hull 124 of mid-body 114. Annular wall 154 extends inwardly from ring-shaped portion 152. A ring shaped wall portion 156 can be included to add structural integrity and reduce the size of plenum 162. Annular lip portion 158 extends a short distance toward aft-most transom 114a and is spaced apart from outer surface 130a of propulsion nozzle 130. Annular wall 154 and annular lip portion 158 are disposed in gas-filled cavity 120 that envelops nearly all of supercavitating vehicle 110.

Annular duct, or inlet 160 is defined between annular lip portion 158 and outer surface 130a of propulsion nozzle 130 to capture liquid (water 100a) flowing into the volume of cavity 120 via an annulus-shaped re-entrant jet 102 of ambient water 100 shown as arrow 102a in FIG. 3. Liquid 100a of annulus-shaped re-entrant jet 102 is directed to and captured in annular plenum 162 that is bounded by ring-shaped portion 152, aft-most transom 114a and annular wall 154 (or ring shaped wall portion 156). The dynamic pressure of liquid 100a of jet 102 is recovered and converted to static pressure via a reduction in velocity that occurs through plenum 162 and plenum nozzles 164 that are mounted to extend through propulsion nozzle 130. Plenum nozzles 164 can be equal-distantly spaced apart from one another around the circumference of propulsion nozzle 130. Liquid 100a that is captured in plenum 162 is redirected from plenum 162 through plenum nozzles 164 and into chamber, or passageway 134a that channels the flow of propulsion gases 134b. Redirected water 100b acts as a diluent that flashes to vapor and is vented from propulsion nozzle 130 as a vaporized part of propulsion plume 134.

Figure 4:
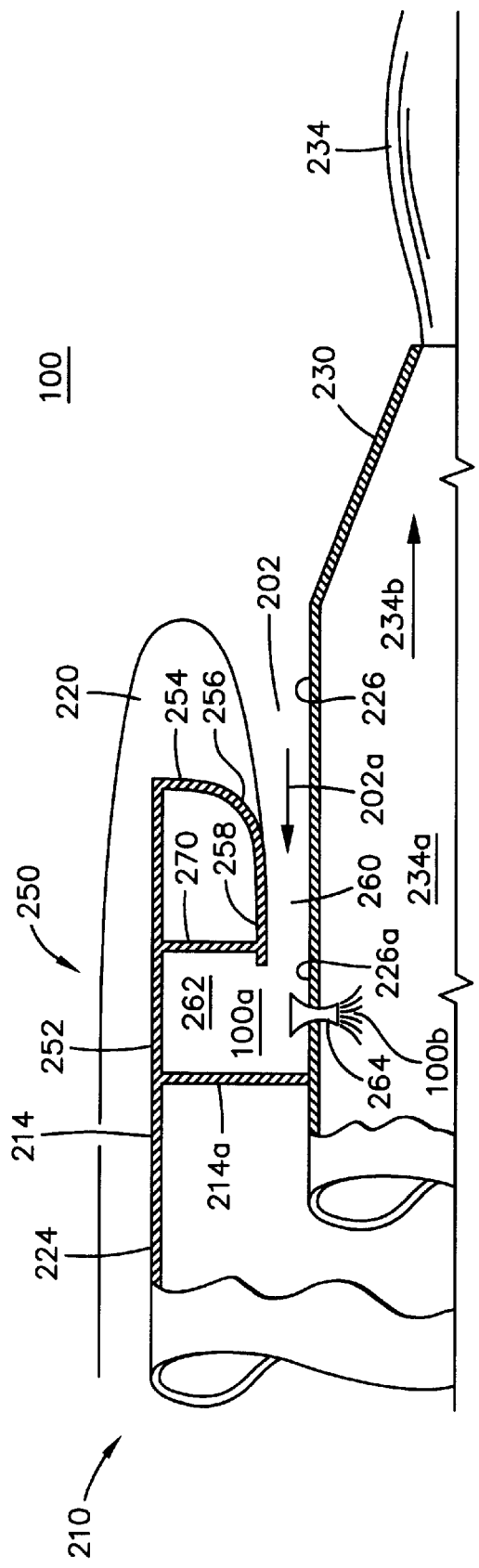
FIG. 4 schematically shows a cross-sectional view of a portion of a third embodiment of a stabilizing device of this invention on a supercavitating vehicle.

FIG. 4 shows another embodiment of the invention in stabilizing device 250 that has an annular inlet 260 to plenum 262 that is shaped to reduce flow losses while maintaining static pressure well below stagnation pressure at the operating speed and depth of a supercavitating vehicle 210. A ring-shaped portion 252 of stabilizing device 250 extends from hull 224 of midbody 214. Annular wall 254 extends inwardly from ring-shaped portion 252 and has an inwardly tapered portion 256 that extends toward transom 214a in annular lip portion 258. Annular wall 254, inwardly tapered portion 256, and annular lip portion 258 are disposed in gas-filled cavity 220 that envelops nearly all of supercavitating vehicle 210.

Annular lip portion 258 extends along and is spaced apart from outer surface 226a of nozzle extender 226, and creates a tapered, streamlined annular inlet 260 between annular lip portion 258 and outer surface 226a. Annular duct, or inlet 260 captures liquid (water 100a) flowing into the volume of cavity 220 via an annulus-shaped re-entrant jet 202 of water 100. Liquid 100a of annulus-shaped re-entrant jet 202 is directed to and captured in annular plenum 262 bounded by ring-shaped portion 252, transom 214a, and annular wall 254. Optionally, ring-shaped wall portion 270 can be included to add structural integrity and help reduce the size of plenum 262. The dynamic pressure of liquid 100a is recovered and converted to static pressure via a reduction in velocity that occurs through plenum 262 and spray heads, or nozzles 264 that are mounted to extend through nozzle extender 226. Nozzles 264 can be equal-distantly spaced apart from one another around the circumference of nozzle extender 226. Liquid 100a that is captured in plenum 262 is thereby redirected from plenum 262 through nozzles 264 and into chamber, or passageway 234a that channels the flow of propulsion gases 234b. Sprayed liquid 100b thereby enters passageway as diluent where it flashes to vapor and is vented via propulsion nozzle 230 as a vaporized part of propulsion plume 234.

Figure 5:
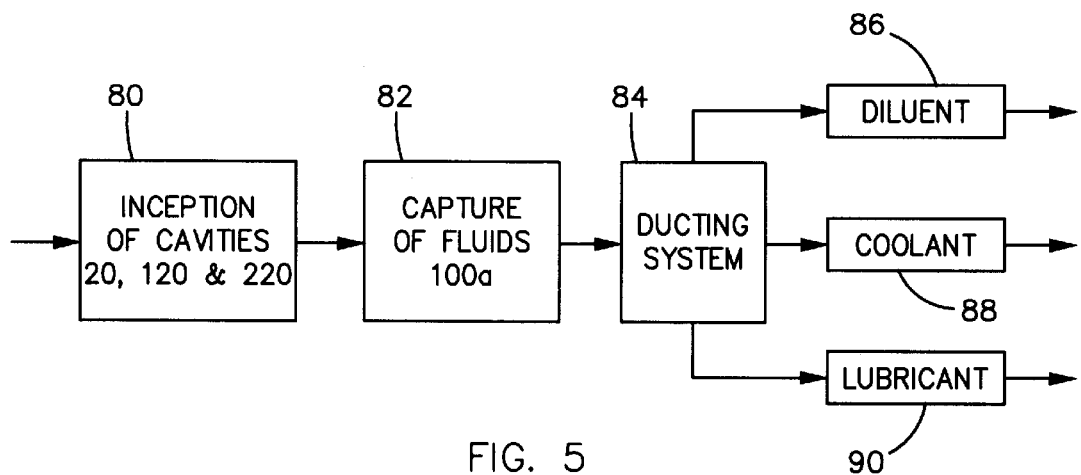
FIG. 5 shows distribution of captured liquid in accordance with this invention.

FIG. 5 schematically shows several exemplary uses that captured liquid 100a can be put to in the embodiments herein described. Dynamics associated with inception 80 of cavities 20, 120 and 220 permitted capture 82 of portions of liquid 100a which can be fed to a ducting system 84 located on-board the host supercavitating vehicle. From ducting system 84 the captured liquid is distributed to dilution, cooling, and lubrication subsystems 86, 88, and 90 before exiting the vehicles hull. Ducting system 84 may incorporate a pump 84a for increasing the total head of captured fluid 100a beyond stagnation pressure at the operating speed and depth of the vehicle.

Figure 6:
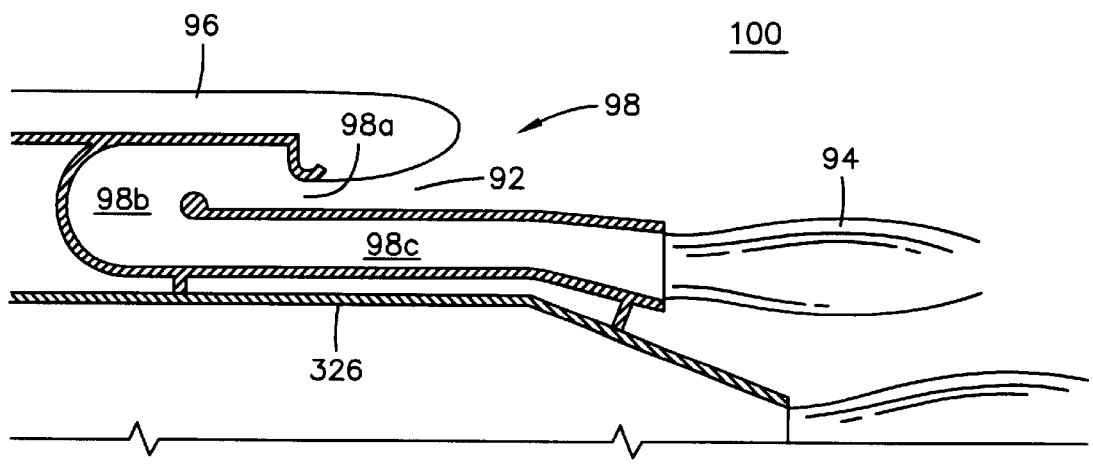
FIG. 6 is a cross-sectional view showing other structure for redirecting re-entrant jet flow of water.

FIG. 6 shows another embodiment of the invention. In this embodiment, a redirecting structure 98 receives at least part of a re-entrant jet flow 92 of water 100 at a mouth 98a. Redirection region 98b is shaped to turn re-entrant jet flow 92 from a forward flow direction to an aftward flowing direction. Conduit 98c carries the redirected jet flow to an annular region 94 located radially outwardly from nozzle extender 326. By providing this redirection well away from the boundary of cavity 96 distubances to the cavity are reduced. Structure 98 for redirection of re-entrant flow 92 can be combined with stabilizing devices 50, 150, and 250 described above or can be applied separately to reduce the problems associated with disturbances to the boundary of a cavity.

The stabilizing devices 50, 150, and 250 of the inventions of FIGS. 2, 3, and 4 respectively reduce the disturbances to boundaries of cavities 20, 120, and 220 by providing alternative paths for the exit of fluids from the cavities. This capability helps reduce underlying causes of unsteadiness of re-entrant jet flows, i.e., impingements of the liquid jets of re-entrant liquids on the boundaries of the cavities. By controlling the process by which liquids entering the cavities via the re-entrant jets are re-entrained into the main flow of ambient liquid 100, secondary re-entrainment of ventilation gas 20 from vents, or ventilation ports 22 will also be reduced, see FIG. 1.

Many variations of constituents discussed herein may be made within the scope of this invention. These variations can be, but are not limited to changes in the relative lengths of fore and midbodies of any supercavitating vehicle. Furthermore, such variations also can be made to selections and dimensions of any nozzle extender, cavitator, midbody, nozzle extender, and nozzle, as well as the forebody and nozzle profiles and any boat-tailing of the nozzle extender, and still be within the scope of this invention. Configurations of the ventilation ports (vents), cavities, the operational conditions and other design dimensions and parameters, are free to be chosen in accordance with this disclosed and claimed invention. In addition, variations may be made within the scope of this invention that are associated with configurations of control surfaces, appendages, sensors, and any geometrical features (including asymmetry of the vehicle or the re-entrant jet inlet) intended to account for gravitational effects on the shape or extent of the cavities or the re-entrant jets themselves.

Having the teachings of this invention in mind, therefore, modifications and alternate embodiments of this invention may be fabricated to have a wide variety of applications in other systems. The disclosed components and their arrangements as disclosed herein all contribute to the novel features of this invention. Stabilizing devices 50, 150, and 250 of this invention are intended to provide a reliable and cost-effective means to stabilize cavitating flows past self-propelled supercavitating vehicles as they pass through the water. Therefore, stabilizing devices 50, 150, and 250 as disclosed herein are not to be construed as limiting, but rather, are intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. The combination of a stabilizing device with a supercavitating vehicle that isolates re-entrant jet flows of liquid from its cavity comprising:
    a receiving means positioned on the supercavitating vehicle where the re-entrant jet flow impinges on the supercavitating vehicle: and
    an exit means joined to said receiving means for carrying said received re-entrant jet flow out of interference with the cavity, said exit means comprising:
        an exhaust nozzle extension extending aft from the aft of the supercavitating vehicle for carrying exhaust from the supercavitating vehicle;
        an exhaust nozzle joined to and in communication with the aft of the exhaust nozzle extension, said exhaust nozzle for carrying exhaust out of the supercavitating vehicle aft of the cavity; and
        a re-entrant jet nozzle positioned in communication between said receiving means and said exhaust nozzle extension for communicating said received re-entrant jet flow out of the supercavitating vehicle.

2. The combination of claim 1 further comprising an aft nozzle positioned in communication between said re-entrant jet flow and said exhaust nozzle before reception of said re-entrant jet flow by said receiving means for additionally diluting said exhaust.

3. The combination of a stabilizing device with a supercavitating vehicle that isolates re-entrant jet flows of liquid from its cavity comprising:
    a receiving means positioned on the supercavitating vehicle where the re-entrant jet flow impinges on the supercavitating vehicle;
    an exit means joined to said receiving means for carrying said received re-entrant jet flow out of interference with the cavity; and
    a ducting system joined to said receiving means for withdrawing received re-entrant jet flow liquid.

4. The combination of claim 3 wherein said ducting system includes a pump for providing additional pressure to said received re-entrant jet flow liquid.

5. The combination of a stabilizing device with a supercavitating vehicle that isolates re-entrant jet flow of liquid from its cavity comprising:
    a receiving means positioned on the supercavitating vehicle where the re-entrant jet flow impinges on the supercavitating vehicle; and
    an exit means joined to said receiving means for carrying said received re-entrant jet flow out of interference with the cavity, said exit means further comprises a passageway having a first end joined to said receiving means and a second end positioned aft of the cavity where the received re-entrant jet flow liquid exits the passageway.

6. The combination of a stabilizing device with a cylindrical supercavitating vehicle that isolates re-entrant jet flows of liquid from a cavity comprising:
    a propulsion means extending aftward from a hull of the cylindrical supercavitating vehicle;
    a transom positioned on the aft portion of the cylindrical supercavitating vehicle's hull;
    a cylindrical wall joined to said transom and extending aftward in continuation of the cylindrical supercavitating vehicle's hull, said cylindrical wall being-positioned radially outside of said propulsion means;
    an annular wall extending inward from the aftmost portion of said cylindrical wall;
    a lip positioned at the innermost portion of said annular wall, said lip, said annular wall, said cylindrical wall, said transom and said propulsion means defining an annular entrance and an annular plenum for receiving the re-entrant jet flow impinging on the supercavitating vehicle; and
    at least one plenum nozzle joined in communication between said plenum and said propulsion means or carrying said received re-entrant jet flow out of interference with the cavity.

7. The combination of claim 6 wherein said propulsion means comprises:
    an exhaust nozzle extension extending aft from the aft of the supercavitating vehicle for carrying exhaust from the supercavitating vehicle;
    an exhaust nozzle joined to and in communication with the aft of the exhaust nozzle extension, said exhaust nozzle for carrying exhaust out of the supercavitating vehicle aft of the cavity; and
    said plenum nozzle being positioned in communication between said plenum and said exhaust nozzle extension for communicating said received re-entrant jet flow out of the supercavitating vehicle.

8. The combination of claim 7 further comprising an aft nozzle positioned in communication between said re-entrant jet flow and said exhaust nozzle before entry of said re-entrant jet flow into said annular entrance for additionally diluting said exhaust.

9. The combination of claim 6 further comprising a ducting system joined to said transom for withdrawing liquid from said plenum.

10. The combination of claim 9 wherein said ducting system includes a pump for providing additional pressure to said liquid from said plenum.

* * * * *